Aug. 30, 1960  M. E. HAINE ET AL  2,951,157
X-RAY APPARATUS

Filed Sept. 11, 1958  2 Sheets-Sheet 1

INVENTORS
MICHAEL EDWARD HAINE
THOMAS MULVEY

BY
ATTORNEYS

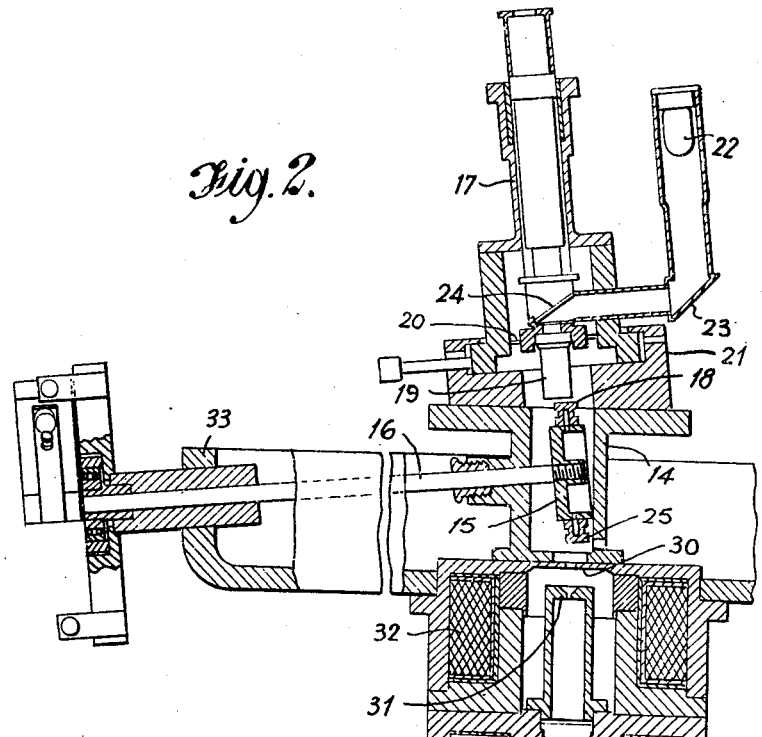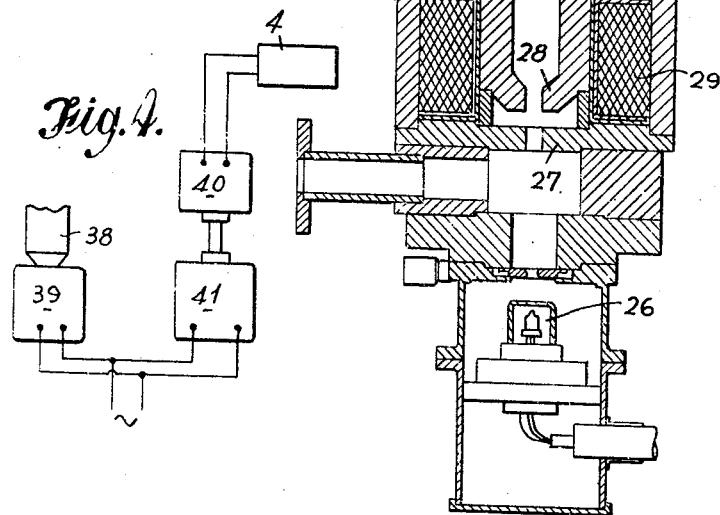

United States Patent Office 2,951,157
Patented Aug. 30, 1960

2,951,157
X-RAY APPARATUS
Michael Edward Haine, Sulhamstead, near Reading, and Thomas Mulvey, Caversham, Reading, England, assignors to Metropolitan-Vickers Electrical Company Limited, London, England, a British company Filed Sept. 11, 1958, Ser. No. 760,472
Claims priority, application Great Britain Sept. 11, 1957
4 Claims. (Cl. 250—52)

This invention relates to X-ray apparatus for analysing materials.

It is known that when a solid body is bombarded with an electron beam of sufficient intensity X-rays are produced and also that the wavelength of the principal X-ray radiation will depend upon the element emitting the radiation. It is also known that when X-rays fall on a known crystal to produce reflections these reflect at a Bragg angle $\theta$ given by $$\sin \theta = \frac{\lambda}{2d}$$

where $\lambda$ is the wavelength and $d$ is a constant associated with the crystal. It has been proposed to analyse solid bodies by causing the body to generate X-rays and reflecting these rays by a crystal, it follows that by measuring the angle of the reflected X-rays it is possible to determine the element from which the X-rays are emitted.

It has been proposed to analyse solid bodies by causing a specimen to emit X-rays, reflecting the X-rays by a crystal and measuring the angle of reflection of the rays reflected from the crystal to determine the element or elements of which the specimen is composed. However, when such apparatus is employed for micro analysis, i.e. for examining a small area of the surface of the specimen, it is necessary to use an electron lens for focusing the electron beam and it is also necessary to provide optical apparatus for examining the bombarded surface of the specimen and clearly provision must be made to ensure that the visual optical system does not interfere with the electron optical system.

It has been proposed to overcome these difficulties by arranging the visual and electron optical systems coaxially and forming the visual system of reflectors centrally apertured for the passage of the electron beam. However, such an arrangement has the drawback that the visual optical apparatus is located within the vacuum and hence cannot easily be changed and furthermore it has to be specially designed and standard apparatus cannot be employed.

The main object of the invention is to provide improved apparatus which avoids the above difficulties.

The present invention comprises X-ray type analysing apparatus including electron optical means for focusing an electron beam on to a specimen to cause the specimen to emit X-rays, means for measuring the angle of reflection of the X-rays when reflected from an appropriate crystalline surface to determine the nature of the specimen, a visual optical system for examining the specimen visually, which visual optical system is separated from the electron optical system together with an adjustable specimen holder adapted to position the specimen either in the electron path to generate X-rays or to position the specimen alternatively in the visual optical system for visual examination as required.

Such an arrangement has the advantage that standard optical apparatus, e.g. optical microscopes, can be employed and furthermore this, apart from the objective lens, can be outside the vacuum system which is necessary for the X-ray lens.

According to a preferred arrangement adjustment apparatus is provided whereby the specimen holder may be rotated between a position in which a selected point on the specimen is located in the electron optical path and an alternative position in which the same point on the specimen is located in the visual system for visual examination.

Preferably this is carried out by adjusting the holder when the specimen is in the viewing position so that a selected point is viewed and means are provided for ensuring that when the holder is rotated to the X-ray generating position the same point that has been viewed optically is bombarded by the electron beam.

The specimen holder may be arranged to carry several different specimens simultaneously at different positions around its periphery which may be examined successively without breaking the vacuum.

According to a further feature of the invention means are provided for examining a specimen by a scanning method, i.e. so that the specimen is examined successively at a number of different points and recording apparatus is synchronously actuated so as to chart the X-ray readings obtained.

In order that the invention may be more clearly understood reference will now be made to the accompanying drawings, in which:

Fig. 2 is a vertical sectional view of one form of apparatus embodying the invention.

Figure 1:
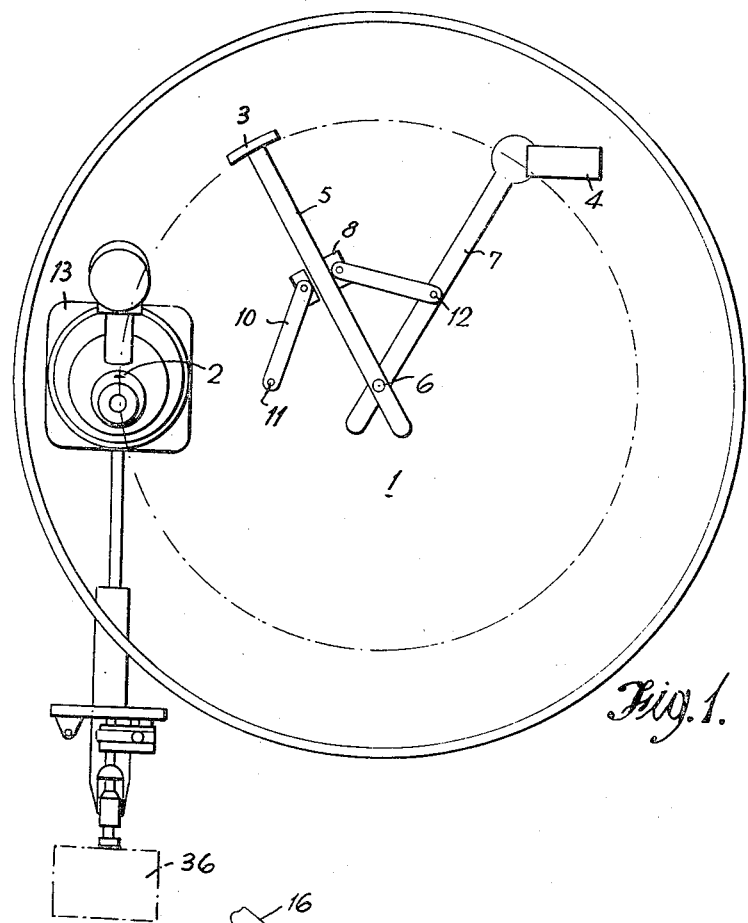
Fig. 1 is a schematic plan view explaining the general idea underlying the invention.

Referring first to Fig. 1 the apparatus shown comprises a horizontal table indicated by the reference 1. The reference 2 indicates the specimen which is bombarded from underneath by an electron beam and viewed from above through optical apparatus. 3 is an X-ray reflecting crystal and 4 a device responsive to the X-rays such as a Geiger counter. The crystal 3 is carried on an arm 5 rotatable about a point 6 and the X-ray detector 4 is carried on an arm 7, also rotatable about the point 6. The arm 5 carries a slider 8 to which are coupled two links 9 and 10. The further end of the link 10 is coupled at 11 to a fixed pivot whilst the further end of the link 9 is coupled at 12 to the arm 7. The linkage is so designed that when the arm 5 is rotated the arm 7 will be rotated through twice the angle traversed by the arm 5 so that the reflected X-rays will always fall on the X-ray sensitive device. The reference 13 indicates generally the apparatus for viewing and bombarding the specimen; this apparatus is shown in greater detail in Fig. 2.

The crystal is preferably one bent to the required curvature and then ground so that a focusing effect is obtained. For any given setting of the crystal relative to the source the reflected beam, contains only those X-rays whose wavelength satisfies the Bragg relation.

It follows that by moving the crystal 3 around the dotted circle different wavelengths of X-rays will be reflected and different elements may be determined by the device 4. It follows that the movement of the arm 7 must be twice that of the corresponding movements of arm 5 to ensure that the X-rays fall on the device 4. This may be effected by interconnecting the arms 5 and 7 through the linkage shown or preferably by means of the linkages forming the subject of co-pending application Serial No. 760,473.

In Fig. 2 the table 1 is shown as a metal plate for the apparatus. The electron bombarding and viewing apparatus essentially comprises a main housing 14 within which is mounted a specimen holder 15. This is carried on a shaft 16 extending obliquely through the wall of the housing 14. Mounted on top of the housing 14 is the optical apparatus; this comprises a normal type of microscope 17 which is arranged to view a specimen 18 located on the top of the specimen holder 15. The microscope is provided with an objective lens 19 projecting into the vacuum space below the sealing diaphragm 20. The block 21 is removable to detach the microscope, for instance, to change the objective lens. Means are also provided for illuminating the specimen by means of a lamp 22, mirror 23 and a half silvered reflector 24. When the specimen holder is rotated through 180° the specimen 18 will be on the underneath of the holder, as indicated at 25.

In this position it can be bombarded by an electron beam to generate X-rays. The electron bombarding apparatus essentially comprises an electron gun 26 and a pair of electron lenses, the lower of which has annular poles 27 and 28 and a winding 29 whilst the upper also has annular poles 30 and 31 and a winding 32. The upper lens may be of the kind described in co-pending Application Serial No. 760,397.

The focusing system is so arranged that a fine electron beam can be projected on to a specimen at 25. Provision is also made for adjusting the position of the specimen holder 15 so that the point bombarded can be selected and for this purpose the microscope will normally be provided with cross wires and when the specimen is in the viewing position the holder would be adjusted to select the point which is seen in the cross wires. The apparatus for effecting this is more clearly shown in Fig. 3 in which the outer end of the rod 16, which projects through the nose 33 of the table 1, carries an arm 34 having an adjusting screw 35 which in the viewing position abuts against the stop plate 36. By adjusting the screw 35 the specimen carrier can be rotated. When moved to the bombarding position it is rotated so that the striker plate 36 abuts against the nose of a screw 37 and this is adjusted so that the area bombarded coincides with the area which previously was aligned with the cross wires of the microscope. Similarly, longitudinal adjustment may be carried out by means of a micrometer type gauge 38 which moves the whole rod 16 and the specimen holder 15 longitudinally. It will be appreciated that normally in operation the area of the specimen will be selected by viewing through the microscope. The specimen holder will then be rotated and it will be bombarded with electrons to produce X-rays and the characteristics of the X-rays emitted will be determined. When the measurement has been finished the specimen will be returned to the viewing position and the next area selected. This process will be repeated so that a series of readings can be taken across a selected area of a specimen. It is usually possible to identify the bombarded area as there will normally be a slight deposit after the bombardment.

Whilst in the arrangement shown the specimen holder only carries one specimen clearly it can carry several at different angular positions.

Such an arrangement is particularly advantageous for calibration purposes in which case one of the specimens would have known characteristics and the unknown may then be compared with it.

Figure 3:
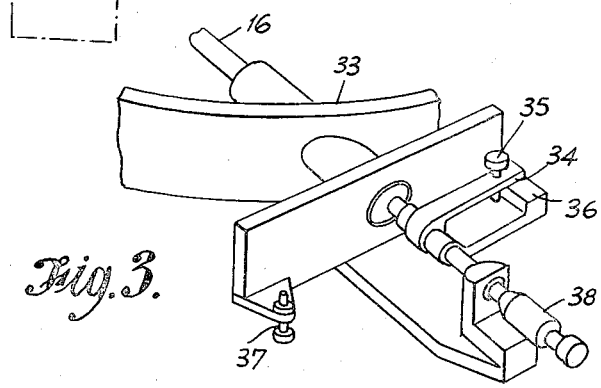
Fig. 3 is a detailed perspective view of the adjusting apparatus for positioning the specimen, and Fig. 4 indicates diagrammatically how scanning apparatus could be arranged.

It is pointed out that whereas in Fig. 2 the arm 36 is either positioned vertically upwards or vertically downwards, Fig. 3, for convenience, shows the arm 33 movable between two horizontal positions; clearly this is the same as Fig. 2 but rotated through 90°.

As previously pointed out scanning of the specimen can be carried out and Fig. 4 shows schematically an example of how this could be arranged.

In the arrangement shown the micrometer 38 (Fig. 3) is rotated by a synchronous motor 39; this moves the specimen linearly.

At the same time a recorder 40 is driven by a synchronous motor 41 which is driven in synchronism with the motor 39. The recorder 40 is operated by a Geiger counter 4 so as to record the readings on a chart. At the same time the chart is moved by the synchronous motor 38 so that the chart readings correspond to the position on the specimen which is under examination.

Whilst in the arrangement shown the chart is synchronised with the specimen electrically clearly this could be done mechanically.

What we claim is:

1. X-ray type analysing apparatus comprising electron optical means for focusing an electron beam on to a specimen to cause the specimen to emit X-rays, a crystalline surface positioned in the path of said X-rays, means for measuring the angle of reflection of the X-rays reflected from said crystalline surface to determine the nature of the specimen and a visual optical system for examining the specimen visually, said visual optical system being located on the opposite side of the specimen to the electron optical system and a rotatable specimen holder with adjustment means whereby the specimen holder may be rotated between a position in which the selected point on the specimen is located in the electron optical path and in an alternative position in which the same point on the specimen is located in the visual system for visual examination.

2. X-ray type analysing apparatus comprising electron optical means for focusing an electron beam on to a specimen to cause the specimen to emit X-rays, a crystalline surface positioned in the path of said X-rays, means for measuring the angle of reflection of the X-rays reflected from said crystalling surface to determine the nature of the specimen and a visual optical system for examining the specimen visually, said visual optical system being separated from the electron optical system and a rotatable specimen holder with means whereby the specimen holder may be rotated between a position in which the selected point on the specimen is located in the electron optical path and in an alternative position in which the same point on the specimen is located in the visual system for visual examination and adjustable stops limiting the rotational movement to the desired position.

3. X-ray type analysing apparatus comprising electron optical means for focusing an electron beam on to a specimen to cause the specimen to emit X-rays, a crystalline surface positioned in the path of said X-rays, means for measuring the angle of reflection of the X-rays from said crystalline surface to determine the nature of the specimen, a visual optical system for examining the specimen visually, said visual optical system being separated from the electron optical system, a rotatable specimen holder adapted to carry several different specimens simultaneously at different positions around its periphery and means whereby the holder may be adjusted to position any selected specimen for visual examination and then rotated to position the same specimen for generation of X-rays.

4. X-ray type analysing apparatus comprising electron optical means for focusing an electron beam on to a specimen to cause the specimen to emit X-rays, a crystalline surface positioned in the path of said X-rays, means for measuring the angle of reflection of the X-rays reflected from said crystalline surface to determine the nature of the specimen and a visual optical system for examining the specimen visually, said visual optical system being separated from the electron optical system and a rotatable speciment holder with adjustment means whereby the specimen holder may be rotated between a position in which the selected point on the specimen is located in the electron optical path and in an alternative position in which the same point on the specimen is located in the visual system for visual examination and means whereby the specimen holder may be traversed axially so as to position a specimen for examination successively at a number of different points on its surface.

References Cited in the file of this patent

UNITED STATES PATENTS

| | | |
|---|---|---|
| 2,626,359 | Weber | Jan. 20, 1953 |
| 2,847,579 | Allen et al. | Aug. 12, 1958 |